(12) United States Patent
Huang (10) Patent No.: US 12,227,989 B2
(45) Date of Patent: Feb. 18, 2025

(54) ENERGY STORAGE CABIN (71) Applicant: XIAMEN HITHIUM ENERGY STORAGE TECHNOLOGY CO., LTD., Fujian (CN)

(72) Inventor: Shoutao Huang, Fujian (CN)

(73) Assignee: XIAMEN HITHIUM ENERGY STORAGE TECHNOLOGY CO., LTD., Fujian (CN)

( * ) Notice: Subject to any disclaimer, the term of this patent is extended or adjusted under 35 U.S.C. 154(b) by 0 days.

(21) Appl. No.: 18/657,801

(22) Filed: May 8, 2024

(65) Prior Publication Data
US 2024/0376767 A1  Nov. 14, 2024

(30) Foreign Application Priority Data
May 9, 2023 (CN) .......................... 202321098520.1

(51) Int. Cl.
*E06B 3/70* (2006.01)
*E04H 5/02* (2006.01)
*E06B 5/16* (2006.01)

(52) U.S. Cl.
CPC ............ *E06B 3/7015* (2013.01); *E04H 5/02* (2013.01); *E06B 5/164* (2013.01); *E06B 2003/7032* (2013.01)

(58) Field of Classification Search
CPC .......... E06B 3/7015; E06B 2003/7032; E06B 5/164
See application file for complete search history.

(56) References Cited

U.S. PATENT DOCUMENTS 2,078,207 A * 4/1937 Page .......................... E06B 5/20
  181/290
10,597,932 B1 * 3/2020 Cipri ........................ A62C 2/06
(Continued)

FOREIGN PATENT DOCUMENTS

CN      204136754 U     2/2015
CN      204373520 U     6/2015
(Continued)

OTHER PUBLICATIONS

The Grant Notice from corresponding Chinese Application No. 202321098520.1, dated Aug. 24, 2023. English translation attached.
(Continued)

*Primary Examiner* — Adriana Figueroa (57) ABSTRACT

The present disclosure relates to an energy storage cabin. The energy storage cabin includes a cabin body and a cabin door. The cabin body has an opening and a first accommodation space. The cabin door is disposed at the opening of the cabin body in an openable and closable manner. The cabin door includes an inner door panel, an outer door panel, and a connecting member. The inner door panel is located at an inner side of the outer door panel in a stacking manner. A thermal insulation layer is provided between the inner door panel and the outer door panel. The connecting member penetrates the inner door panel to connect the inner door panel with the outer door panel. A heat insulation pad is sandwiched between the inner door panel and the outer door panel at a position where the connecting member penetrates the inner door panel.

16 Claims, 6 Drawing Sheets

(56) References Cited

U.S. PATENT DOCUMENTS

| | | | | |
|---|---|---|---|---|
| 2019/0103641 | A1* | 4/2019 | O'Hora | H02J 7/00 |
| 2023/0095593 | A1* | 3/2023 | Meng | H01M 50/251 |
| | | | | 361/691 |
| 2024/0014467 | A1* | 1/2024 | Li | H01M 50/244 |
| 2024/0072323 | A1* | 2/2024 | Zhou | H01M 50/258 |

FOREIGN PATENT DOCUMENTS

| | | | |
|---|---|---|---|
| CN | 206231579 U | | 6/2017 |
| CN | 109057647 A | | 12/2018 |
| CN | 112803099 A | | 5/2021 |
| CN | 113937405 A | | 1/2022 |
| CN | 216958227 U | | 7/2022 |
| CN | 219696621 U | | 9/2023 |
| CN | 117468843 A | | 1/2024 |
| DE | 2612447 A1 | * | 9/1977 |
| DE | 3047029 A1 | * | 7/1982 |
| DE | 0674088 A1 | * | 9/1995 |
| KR | 200430961 Y1 | | 11/2006 |
| KR | 20090008353 U | * | 8/2009 |
| KR | 20130001882 U | * | 3/2013 |
| KR | 101611587 B1 | * | 4/2016 |
| KR | 20190108974 A | | 9/2019 |
| KR | 20190131955 A | | 11/2019 |

OTHER PUBLICATIONS

International Search Report dated Jun. 8, 2024 in International Application No. PCT/CN2024/080595. English translation attached.
Written Opinion of the ISA dated Jun. 8, 2024 in International Application No. PCT/CN2024/080595. English translation attached.
Extended European Search Report from corresponding European Application No. EP24174653.6, dated Sep. 19, 2024.

* cited by examiner

ENERGY STORAGE CABIN

CROSS-REFERENCE TO RELATED APPLICATIONS

This application claims priority to Chinese patent application No. 202321098520.1 filed on May 9, 2023, the entire disclosure of which is incorporated herein by reference.

FIELD

The present disclosure relates to the field of energy storage technologies, and more particularly, to an energy storage cabin.

BACKGROUND

An energy storage cabin is mainly used to store an energy storage element such as a battery and can also have a temperature control system and a heat dissipation system therein. The battery generates a large amount of heat during charging and discharging. The temperature control system and the heat dissipation system are used to control a temperature in the energy storage cabin, such that a temperature of an environment where the battery is located falls within a predetermined temperature range. However, during an actual operation, the temperature in the energy storage cabin can be uncontrollable.

SUMMARY

An energy storage cabin includes: a cabin body having at least one opening and a first accommodation space for accommodating an energy storage element; and at least one cabin door each disposed at each of the at least one opening of the cabin body in an openable and closable manner. Each of the at least one cabin door includes an inner door panel, an outer door panel, and a plurality of connecting members for connecting the inner door panel with the outer door panel. The inner door panel is located at a side of the outer door panel facing towards the first accommodation space. A thermal insulation layer is provided between the inner door panel and the outer door panel. A heat insulation pad is sandwiched between the inner door panel and the outer door panel at each of the plurality of connecting members.

DESCRIPTION OF REFERENCE NUMERALS OF THE ACCOMPANYING DRAWINGS 10, energy storage cabin; 11, cabin body; 12, cabin door; 121, outer door panel; 122, inner door panel; 123, fixation frame; 1231, first supporting member; 1232, second supporting member; 1233, second accommodation space; 124, reinforcing rib; 1241, connection portion; 1422, extension portion; 125, thermal insulation layer; 126, heat insulation pad; 127, connecting member.

DETAILED DESCRIPTION

In order to clarify and explain the above-mentioned objects, features, and advantages of the present disclosure, specific embodiments of the present disclosure are described in detail below in conjunction with the accompanying drawings. In the following description, many specific details are provided to facilitate full understanding of the present disclosure. However, the present disclosure can be implemented in various manners other than those described herein, and similar improvements can be made by those skilled in the art without contradicting the intent of the present disclosure. Therefore, the present disclosure is not limited by specific embodiments disclosed below.

Figure 1:
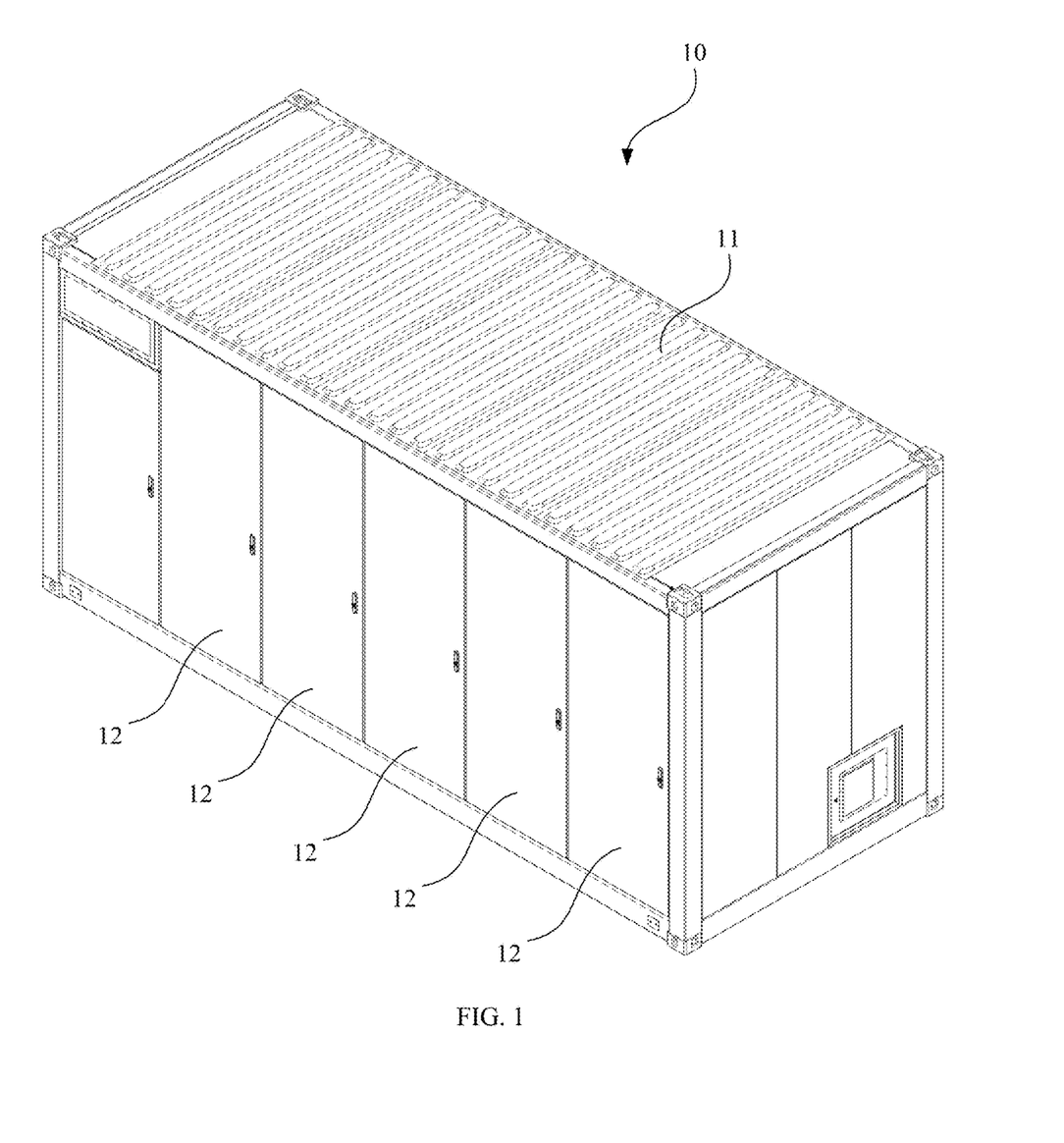
FIG. 1 is a schematic view of a structure of an energy storage cabin according to an embodiment.

As illustrated in FIG. 1, in some embodiments of the present disclosure, an energy storage cabin 10 is provided. The energy storage cabin 10 includes a cabin body 11 and at least one cabin door 12. The cabin body 11 has a first accommodation space for accommodating an energy storage element. For example, a battery and a temperature control system can be mounted in the first accommodation space. The cabin body 11 has at least one opening. The at least one cabin door 12 is disposed at the at least one opening of the cabin body 11 in an openable and closable manner.

As illustrated in FIG. 2 to FIG. 5, the cabin door 12 includes an inner door panel 122, an outer door panel 121, and a plurality of connecting members 127 for connecting the inner door panel 122 with the outer door panel 121. The inner door panel 122 is located at a side of the outer door panel 121 facing towards the first accommodation space. A thermal insulation layer 125 is provided between the inner door panel 122 and the outer door panel 121. A heat insulation pad 126 is sandwiched between the inner door panel 122 and the outer door panel 121 at each connecting member 127.

In the energy storage cabin 10 provided in the above solution, the cabin door 12 includes the inner door panel 122 and the outer door panel 121. Also, the thermal insulation layer 125 is provided between the inner door panel 122 and the outer door panel 121. Further, the heat insulation pad 126 is sandwiched at a position where the inner door panel 122 and the outer door panel 121 are connected by the connecting member 127. In this way, the inner door panel 122 is in no direct contact with the outer door panel 121. A thermal conductivity of the thermal insulation layer 125 is smaller than a thermal conductivity of the inner door panel 122 and a thermal conductivity of the outer door panel 121. Similarly, a thermal conductivity of the heat insulation pad 126 is smaller than the thermal conductivity of the inner door panel 122 and the thermal conductivity of the outer door panel 121. Since heat transfer between an inside of the cabin door 12 and an outside of the cabin door 12 needs to pass through the thermal insulation layer 125 or the heat insulation pad 126, the cabin door 12 as a whole has a relatively low thermal conductivity. Therefore, a quantity of heat/refrigeration in the first accommodation space can be stored for a long time, and a probability that a quantity of heat/refrigeration outside the energy storage cabin 10 is transferred to the first accommodation space through the cabin door 12 is greatly reduced, such that a temperature in the energy storage cabin 10 can be accurately controlled.

Figure 2:
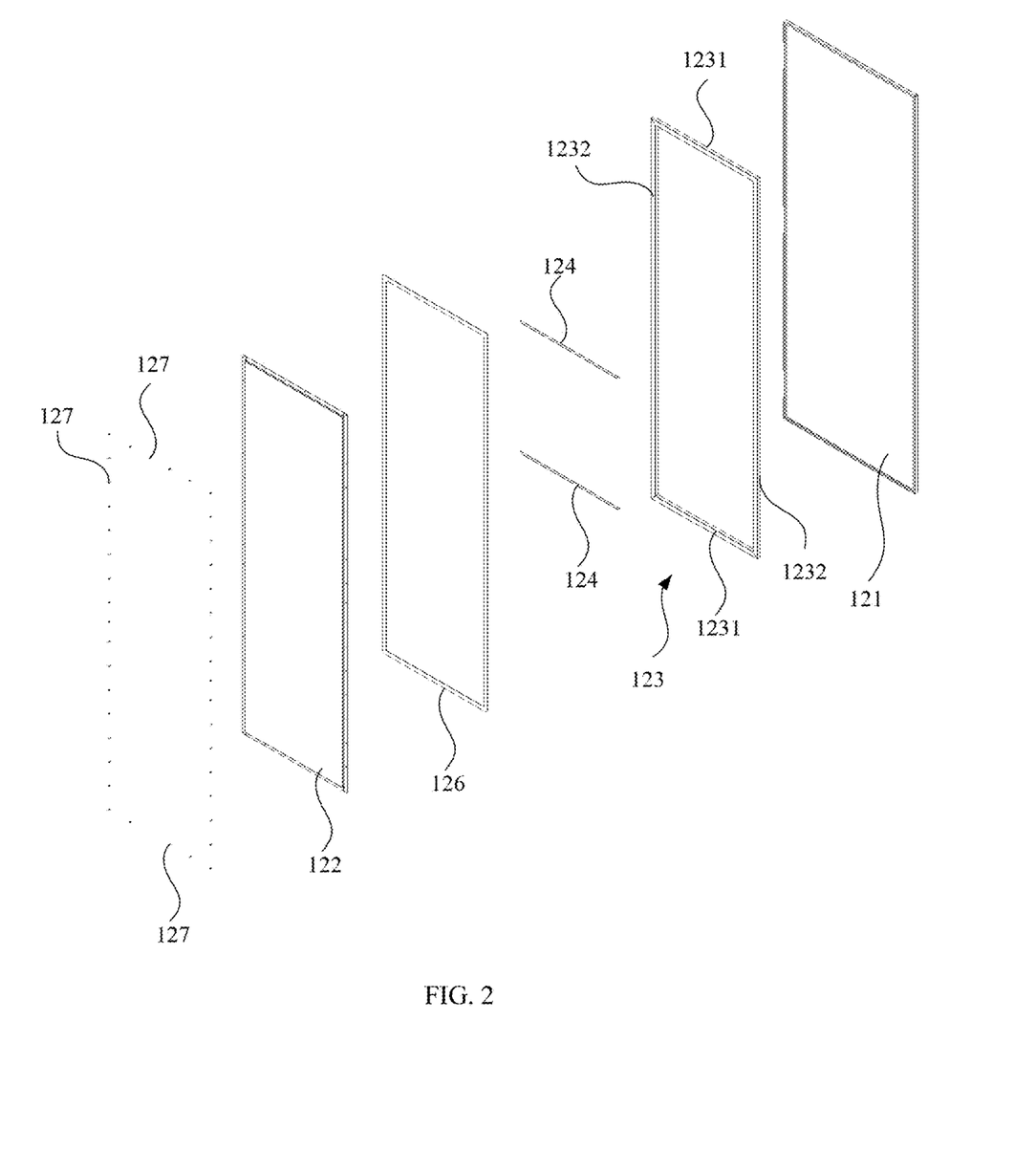
FIG. 2 is an exploded view of a cabin door in the energy storage cabin illustrated in FIG. 1.

As illustrated in FIG. 2, in some embodiments, the heat insulation pad 126 has an annular closed structure. The heat insulation pad 126 corresponding to an outer periphery of the inner door panel 122 is tightly pressed between the outer door panel 121 and an outer periphery of the inner door panel 122. The connecting member 127 penetrates the outer periphery of the inner door panel 122, the heat insulation pad 126, and the outer door panel 121 to connect the inner door panel 122, the heat insulation pad 126, and the outer door panel 121 together.

The annular closed structure is a structure connected end-to-end and capable of forming a closed space, such as a frame structure formed in a polygonal shape and a circular element.

Further, in some embodiments, as illustrated in FIG. 2 to FIG. 5, a fixation frame 123 is provided at the side of the outer door panel 121 facing towards the first accommodation space. The connecting member 127 penetrates the inner door panel 122 and the fixation frame 123 in an arrangement direction from the inner door panel 122 to the outer door panel 121 to connect the inner door panel 122 with the outer door panel 121. The heat insulation pad 126 has an annular closed structure in a shape corresponding to a shape of the fixation frame 123. The heat insulation pad 126 is sandwiched between the fixation frame 123 and an outer periphery of the inner door panel 122. The fixation frame 123 provides an elevation, such that a thickness of a space between the inner door panel 122 and the outer door panel 121 meets a requirement of the thermal insulation layer 125. The overall thermal conductivity of the cabin door 12 is greatly reduced when a thickness of the thermal insulation layer 125 meets a thermal insulation and heat preservation requirement.

In other embodiments, the connecting member 127 can directly penetrate the inner door panel 122 and the outer door panel 121 to connect the inner door panel 122 and the outer door panel 121 together.

After the fixation frame 123 is provided at the side of the outer door panel 121 facing towards the first accommodation space, the inner door panel 122 and the outer door panel 121 are indirectly connected together through the fixation frame 123. In this case, the connecting member 127 and the outer door panel 121 have no need to be in direct contact. On the one hand, there is no trace of mounting of the connecting member 127 at an outer side surface of the cabin door 12. On the other hand, heat between the inner door panel 122 and the outer door panel 121 is kept from being transferred simply through the connecting member 127, further reducing a heat transfer efficiency.

Figure 4:
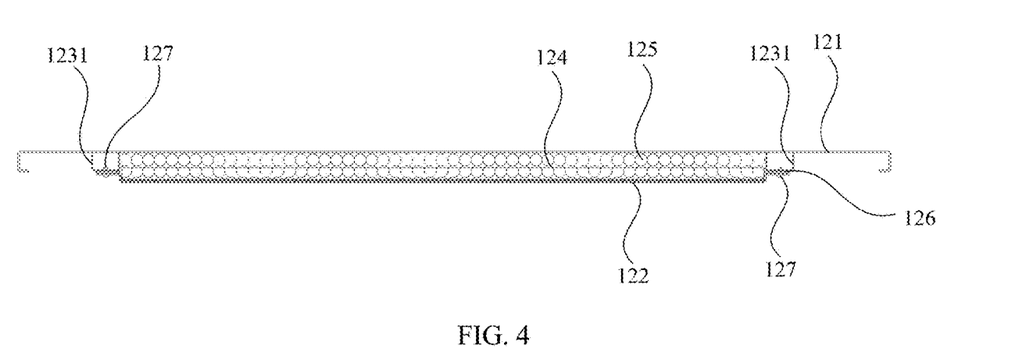
FIG. 4 is a cross-sectional view taken along line A-A in FIG. 3.
Figure 5:
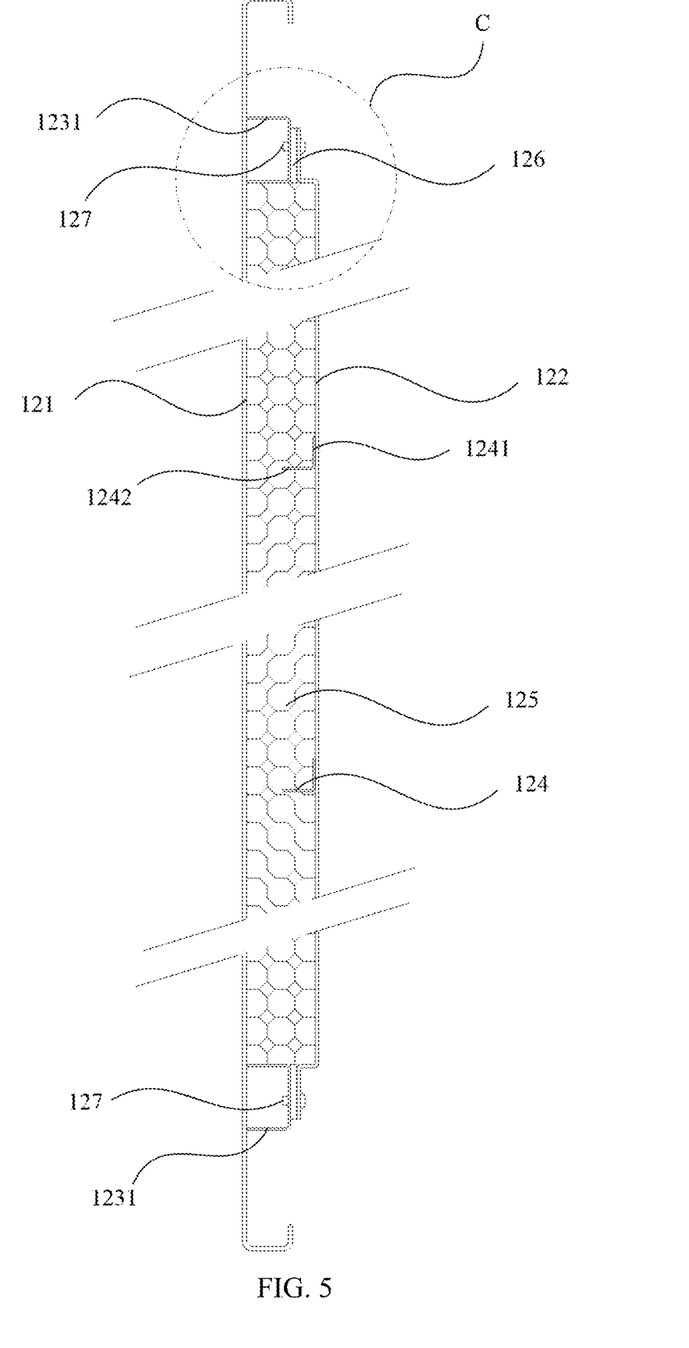
FIG. 5 is a cross-sectional view taken along line B-B in FIG. 3.
Figure 6:
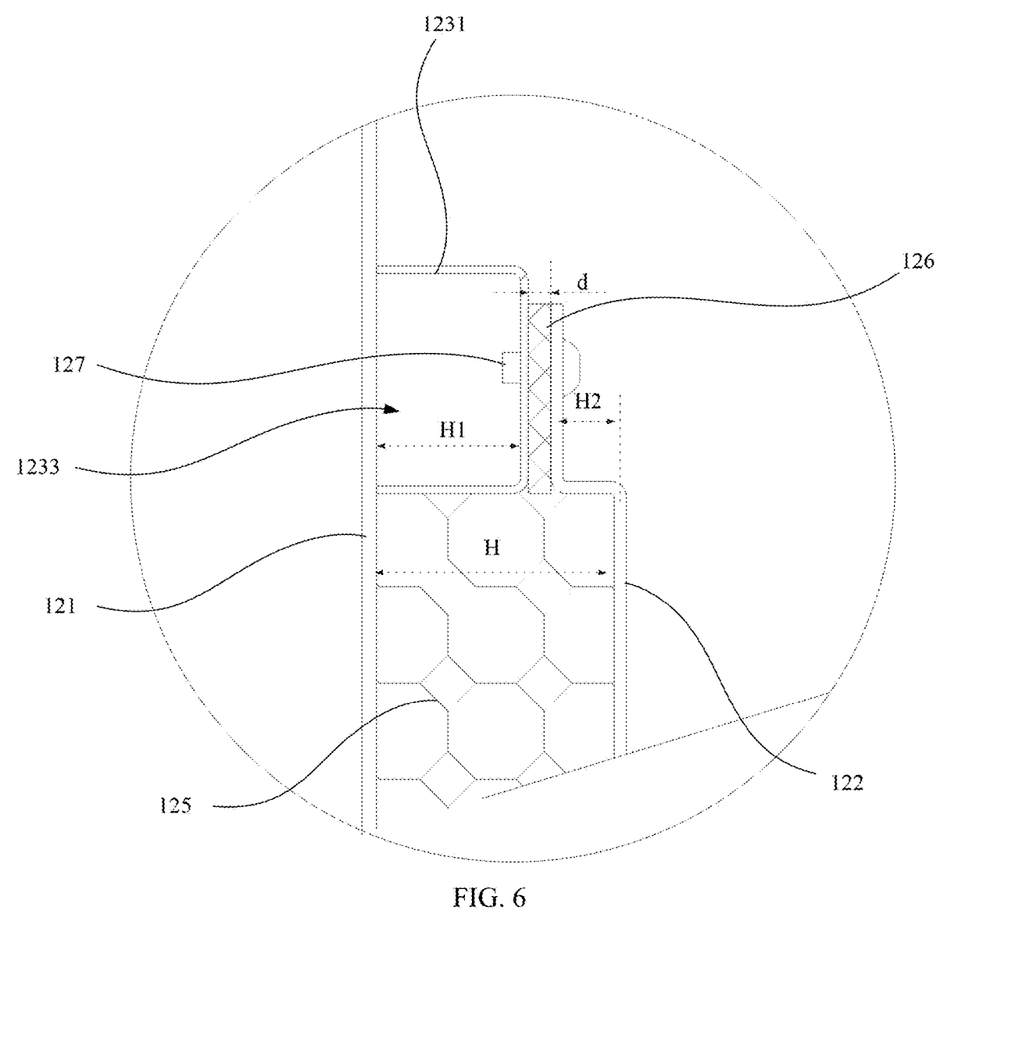
FIG. 6 is an enlarged partial view of part C in FIG. 5.

In some embodiments, as illustrated in FIG. 4 and FIG. 5, the fixation frame 123 includes two first supporting members 1231 that are opposite to each other in a length direction of the cabin door 12 and two second supporting members 1232 that are opposite to each other in a width direction of the cabin door 12. The two first supporting members 1231 and the two second supporting members 1232 are connected end-to-end in sequence to form the fixation frame 123 corresponding to the outer periphery of the inner door panel 122. As illustrated in FIG. 5 and FIG. 6, each of the first supporting member 1231 and the second supporting member 1232 includes a bottom wall and two side walls. The two side walls are located between the bottom wall and the outer door panel. The two side walls, the bottom wall, and the outer door panel 121 enclose to form a second accommodation space 1233. The connecting member 127 is connected to the inner door panel 122 and the bottom wall. At least part of the connecting member 127 is accommodated in the second accommodation space 1233. The heat insulation pad 126 is sandwiched between the bottom wall and the outer periphery of the inner door panel 122.

In some embodiments, the connecting member 127 includes a screw. The screw is partially located in the second accommodation space 1233 when connecting the fixation frame 123 with the inner door panel 122.

The fixation frame 123 can be welded to the outer door panel 121. For example, two side walls of each of the first supporting member 1231 and the second supporting member 1232 can be welded to the outer door panel 121.

Further, as illustrated in FIG. 4 and FIG. 5, in some embodiments, a middle part of the inner door panel 122 protrudes relative to the outer periphery of the inner door panel 122 by a height of H2 in a direction away from the outer door panel 121. Therefore, a groove is formed at a side of the inner door panel 122 facing towards the outer door panel 121. The groove can accommodate the thermal insulation layer 125. When the inner door panel 122 is filled with the thermal insulation layer 125, the groove can define a region filled with the thermal insulation layer 125.

As illustrated in FIG. 6, the fixation frame 123 has a thickness of H1. The heat insulation pad 126 has a thickness of d. A distance H is formed between the middle part of the inner door panel 122 and the outer door panel 121, where H=H1+H2+d. When the outer periphery of the inner door panel 122 is connected to the fixation frame 123, a distance between the middle part of the inner door panel 122 and the outer door panel 121 is relatively large, and thus the thermal insulation layer 125 provided between the inner door panel 122 and the outer door panel 121 has a heat preservation and thermal insulation capacity meeting a requirement of the energy storage cabin 10.

Further, as illustrated in FIG. 2, in some embodiments, each of the plurality of connecting members 127 is a fastener, such as a screw, a rivet, an elastic fitting member, or the like. The plurality of fasteners is evenly arranged at intervals in a peripheral direction of the fixation frame 123. The entire fixation frame 123 is locked together with the inner door panel 122, and thus the fixation frame 123 and the inner door panel 122 are reliably connected to each other.

Figure 3:
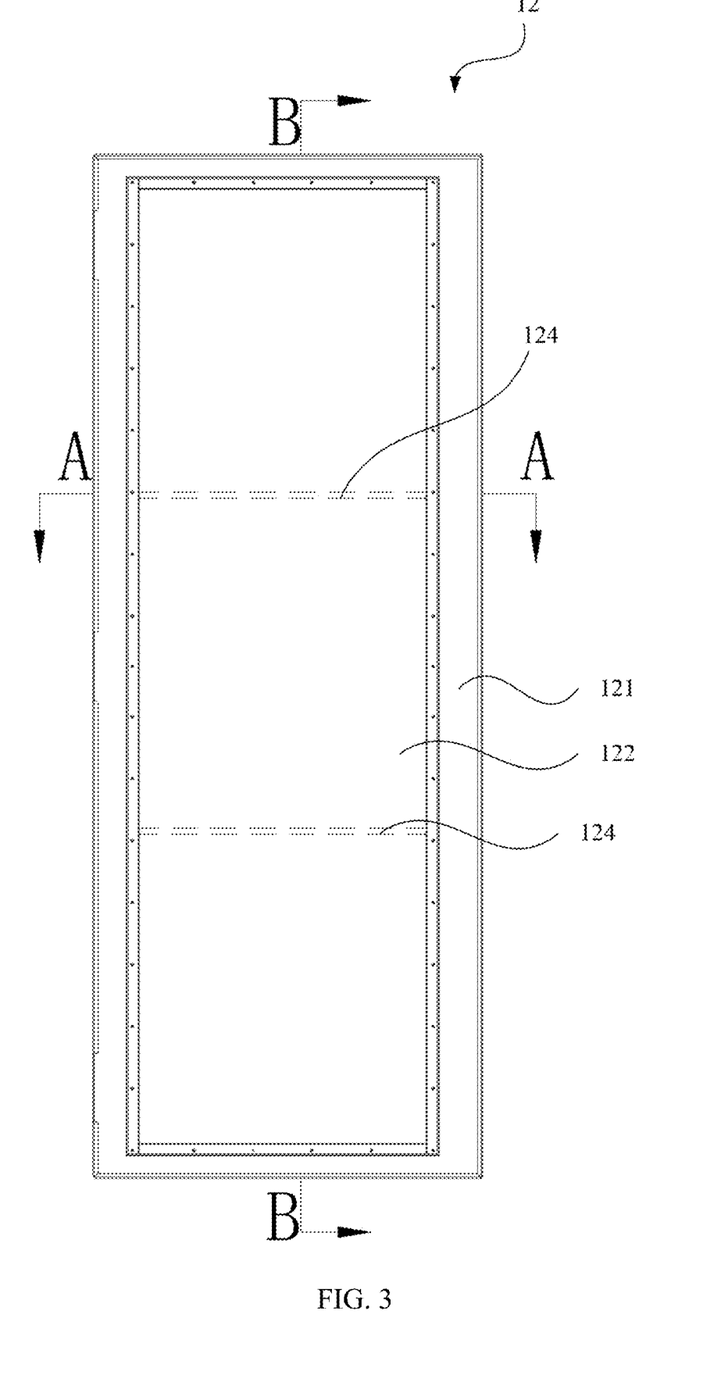
FIG. 3 is a front view of the cabin door illustrated in FIG. 2.

Furthermore, as illustrated in FIG. 3 to FIG. 5, in some embodiments, a side surface of the inner door panel 122 facing towards the outer door panel 121 is provided with a plurality of reinforcing ribs 124 arranged at intervals. Each reinforcing rib 124 is located between the inner door panel 122 and the outer door panel 121. In particular, the reinforcing rib 124 can be welded to the inner door panel 122. The reinforcing rib 124 provided at an outer side surface of the inner door panel 122 effectively improve a strength of the cabin door 12.

In an embodiment, as illustrated in FIG. 4 and FIG. 5, a length direction of each reinforcing rib 124 is consistent with a width direction of the corresponding cabin door 12. In another exemplary embodiment of the present disclosure, the reinforcing rib 124 can be arranged in other directions, which is not limited in the present disclosure.

In some embodiments, as illustrated in FIG. 4 and FIG. 5, each reinforcing rib 124 is inserted into the thermal insulation layer 125. The reinforcing rib 124 inserted into the thermal insulation layer 125 not only improves the strength of the cabin door 12, but also avoid heat conduction through the reinforcing rib 124.

As illustrated in FIG. 5, in some embodiments, the reinforcing rib 124 includes a connection portion 1241 and an extension portion 1242 that are connected to each other to form a structure with an L-shaped cross section. The connection portion 1241 is connected to the inner door panel 122. The extension portion 1242 protrudes towards the outer door panel 121.

Further, in particular, in some embodiments, the thermal insulation layer 125 is a rock wool board provided between the inner door panel 122 and the outer door panel 121. Thermal insulation properties of rock wool enables a low efficiency of energy transfer between a space inside the energy storage cabin 10 and a space outside the energy storage cabin 10, which in turn allows for accurate temperature control of the space inside the energy storage cabin 10.

As illustrated in FIG. 1 and FIG. 3, in some embodiments, the outer door panel 121 is hinged to the cabin body 11, and the cabin door 12 is openable and closable at the opening of the cabin body 11. The cabin door 12 is hingedly connected to the cabin body 11 for easy opening and closing. A plurality of hinge positions can be formed at a longitudinally distributed sideline of the outer door panel 121, for allowing the outer door panel 121 to be hinged to the cabin body 11.

As illustrated in FIG. 1, in some embodiments, the cabin body 11 has a plurality of first accommodation spaces and a plurality of openings. Each of the plurality of first accommodation spaces corresponds to one of the plurality of openings. Each of the plurality of openings is provided with one cabin door 12. The plurality of first accommodation spaces can hold energy storage elements such as batteries and provides a large storage space. A temperature control system can be provided in the first accommodation space and configured to control a temperature in the first accommodation space.

In the description of the present disclosure, it should be understood that, the orientation or the position indicated by terms such as "center", "longitudinal", "lateral", "length", "width", "thickness", "over", "below", "front", "rear", "left", "right", "vertical", "horizontal", "top", "bottom", "inner", "outer", "clockwise", "anti-clockwise", "axial", "radial", and "circumferential" should be construed to refer to the orientation and the position as shown in the drawings, and is only for the convenience of describing the present disclosure and simplifying the description, rather than indicating or implying that the pointed device or element must have a specific orientation, or be constructed and operated in a specific orientation, and therefore cannot be understood as a limitation of the present disclosure.

In addition, the terms "first" and "second" are only used for descriptive purposes, and cannot be understood as indicating or implying relative importance or implicitly indicating the number of indicated technical features. Therefore, the features associated with "first" and "second" may explicitly or implicitly include at least one of the features. In the description of the present disclosure, "plurality" means at least two, unless otherwise specifically defined.

In the present disclosure, unless otherwise clearly stipulated and limited, terms such as "install", "connect", "connect to", "fix" and the like should be understood in a broad sense. For example, it may be a fixed connection or a detachable connection or connection as one piece; mechanical connection or electrical connection; direct connection or indirect connection through an intermediate; internal communication of two components or the interaction relationship between two components, unless otherwise clearly limited. For those skilled in the art, the specific meaning of the above-mentioned terms in the present disclosure can be understood according to specific circumstances.

In the present disclosure, unless expressly specified and defined otherwise, the first feature "on" or "under" the second feature may mean that the first feature is in direct contact with the second feature, or the first and second features are in indirect contact through an intermediate. Moreover, the first feature "above" the second feature may mean that the first feature is directly above or obliquely above the second feature, or simply mean that the level of the first feature is higher than that of the second feature. The first feature "below" the second feature may mean that the first feature is directly below or obliquely below the second feature, or simply mean that the level of the first feature is smaller than that of the second feature.

It should be noted that when an element is described as being "fixed to" or "arranged on" another element, it may be directly on the other element or an intermediate element may exist between the elements. When an element is interpreted as being "connected" to another element, it may be directly connected to the other element or an intermediate element may exist between the elements. As used herein, the terms "vertical", "horizontal", "over", "below", "left", and "right" and similar expressions are used for illustrative purposes only and are not meant to be the only means of implementation.

Technical features in the above embodiments can be combined arbitrarily. For the sake of concise description, not all possible combinations of the technical features in the above embodiments are described. However, as long as there is no conflict between the technical features, any combination of technical features in the above embodiments should be considered as falling within the scope of the present disclosure.

While several embodiments of the present disclosure have been described above in a specific and detailed manner, the protection scope of the present disclosure cannot be construed as being limited to these embodiments. It should be noted that, those skilled in the art can make various variants and improvements without departing from the concept of the present disclosure, and these variants and improvements shall fall within the protection scope of present disclosure as defined by the claims as appended.

What is claimed is:

1. An energy storage cabin, comprising:
   a cabin body having at least one opening and a first accommodation space for accommodating an energy storage element, and
   at least one cabin door each disposed at each of the at least one opening of the cabin body in an openable and closable manner, wherein:
   each of the at least one cabin door comprises an inner door panel, an outer door panel, and a plurality of connecting members for connecting the inner door panel with the outer door panel;
   the inner door panel is located at a side of the outer door panel facing towards the first accommodation space;
   a thermal insulation layer is provided between the inner door panel and the outer door panel; and
   a heat insulation pad is sandwiched between the inner door panel and the outer door panel at each of the plurality of connecting members,
   wherein:
   a fixation frame is provided at the side of the outer door panel facing towards the first accommodation space, wherein the fixation frame is partially visible from the outside of the at least one cabin door;
   each of the plurality of connecting members penetrates the inner door panel and the fixation frame in an arrangement direction from the inner door panel to the outer door panel to connect the inner door panel with the outer door panel;

the heat insulation pad has an annular closed structure in a shape corresponding to a shape of the fixation frame; and the heat insulation pad is sandwiched between the fixation frame and an outer periphery of the inner door panel.

2. The energy storage cabin according to claim 1, wherein:

the fixation frame comprises two first supporting members that are opposite to each other in a length direction of the cabin door and two second supporting members that are opposite to each other in a width direction of the cabin door, the two first supporting members and the two second supporting members being connected end-to-end in sequence to form the fixation frame corresponding to the outer periphery of the inner door panel;

each of the two first supporting members and the two second supporting members comprises a bottom wall and two side walls located between the bottom wall and the outer door panel;

a second accommodation space is defined by the two side walls, the bottom wall, and the outer door panel;

each of the plurality of connecting members is connected to the inner door panel and the bottom wall, at least part of the connecting member being accommodated in the second accommodation space; and the heat insulation pad is sandwiched between the bottom wall and the outer periphery of the inner door panel.

3. The energy storage cabin according to claim 1, wherein:

the fixation frame has a thickness of H1;

a middle part of the inner door panel protrudes relative to the outer periphery of the inner door panel by a height of H2 in a direction facing away from the outer door panel;

the heat insulation pad has a thickness of d; and a distance H is formed between the middle part of the inner door panel and the outer door panel, where H=H1+H2+d.

4. The energy storage cabin according to claim 1, wherein each of the plurality of connecting members is a fastener, the plurality of connecting members being evenly arranged at intervals in a peripheral direction of the fixation frame.

5. The energy storage cabin according to claim 1, wherein a side surface of the inner door panel facing towards the outer door panel is provided with a plurality of reinforcing ribs arranged at intervals, each of the plurality of reinforcing ribs being located between the inner door panel and the outer door panel.

6. The energy storage cabin according to claim 5, wherein:

each of the plurality of reinforcing ribs is inserted into the thermal insulation layer, a length direction of each of the plurality of reinforcing ribs being consistent with a width direction of each corresponding cabin door of the at least one cabin door; and/or each of the plurality of reinforcing ribs comprises a connection portion and an extension portion that are connected to each other to form a structure with an L-shaped cross section, the connection portion being connected to the inner door panel, and the extension portion protruding towards the outer door panel.

7. The energy storage cabin according to claim 1, wherein the thermal insulation layer is a rock wool board provided between the inner door panel and the outer door panel.

8. The energy storage cabin according to claim 1, wherein the outer door panel is hinged to the cabin body, and the at least one cabin door is openable and closable at the at least one opening of the cabin body.

9. The energy storage cabin according to claim 1, wherein:

the cabin body has a plurality of first accommodation spaces and a plurality of openings;

each of the plurality of first accommodation spaces corresponds to one of the plurality of openings;

each of the plurality of openings is provided with one cabin door; and each first accommodation space of the plurality of first accommodation spaces has a temperature control system provided therein and configured to control a temperature in the first accommodation space.

10. The energy storage cabin according to claim 2, wherein a side surface of the inner door panel facing towards the outer door panel is provided with a plurality of reinforcing ribs arranged at intervals, each of the plurality of reinforcing ribs being located between the inner door panel and the outer door panel.

11. The energy storage cabin according to claim 3, wherein a side surface of the inner door panel facing towards the outer door panel is provided with a plurality of reinforcing ribs arranged at intervals, each of the plurality of reinforcing ribs being located between the inner door panel and the outer door panel.

12. The energy storage cabin according to claim 4, wherein a side surface of the inner door panel facing towards the outer door panel is provided with a plurality of reinforcing ribs arranged at intervals, each of the plurality of reinforcing ribs being located between the inner door panel and the outer door panel.

13. The energy storage cabin according to claim 2, wherein the thermal insulation layer is a rock wool board provided between the inner door panel and the outer door panel.

14. The energy storage cabin according to claim 3, wherein the thermal insulation layer is a rock wool board provided between the inner door panel and the outer door panel.

15. The energy storage cabin according to claim 4, wherein the thermal insulation layer is a rock wool board provided between the inner door panel and the outer door panel.

16. The energy storage cabin according to claim 2, wherein the outer door panel is hinged to the cabin body, and the at least one cabin door is openable and closable at the at least one opening of the cabin body.

* * * * *